(12) United States Patent  
Le Garrec et al.

(10) Patent No.: US 8,537,025 B2  
(45) Date of Patent: Sep. 17, 2013

(54) ELECTRONIC DEVICE ENABLING NEAR-FIELD CONTACTLESS COMMUNICATIONS

(75) Inventors: Loic Le Garrec, Chateaubourg (FR); Christophe Capitaine, Chateaubourg (FR)

(73) Assignee: Oberthur Technologies, Levallois Perret (FR)

( * ) Notice: Subject to any disclaimer, the term of this patent is extended or adjusted under 35 U.S.C. 154(b) by 909 days.

(21) Appl. No.: 12/610,098

(22) Filed: Oct. 30, 2009

(65) Prior Publication Data

US 2010/0141465 A1    Jun. 10, 2010

(30) Foreign Application Priority Data

Nov. 3, 2008   (FR) ...................................... 08 57470

(51) Int. Cl.
*G08B 21/00*   (2006.01)

(52) U.S. Cl.
USPC ............... 340/686.6; 340/539.23; 340/653; 235/383; 235/492; 307/104

(58) Field of Classification Search
USPC .............. 340/686.6, 539.1, 539.11, 539.23, 340/572.7, 572.8, 573.1, 568.7, 653; 343/856, 343/857; 235/383, 487, 492, 380; 307/104, 307/105
See application file for complete search history.

(56) References Cited

U.S. PATENT DOCUMENTS

| | | | | |
|---|---|---|---|---|
| 6,799,721 B2 * | 10/2004 | Parrault | ........................ | 235/383 |
| 6,805,816 B1 * | 10/2004 | Groenendaal et al. | ........ | 252/500 |
| 7,865,214 B2 * | 1/2011 | Kushima | .................... | 455/562.1 |
| 2004/0112966 A1 * | 6/2004 | Pangaud | ...................... | 235/492 |

FOREIGN PATENT DOCUMENTS

| | | |
|---|---|---|
| WO | WO 02/01496 A | 1/2002 |
| WO | WO 02/11062 A | 2/2002 |
| WO | WO 03/056510 A | 7/2003 |

* cited by examiner

*Primary Examiner* — Hung T. Nguyen
(74) *Attorney, Agent, or Firm* — LaRiviere, Grubman & Payne, LLP

(57) ABSTRACT

A portable electronic device comprises an antenna ANT connected to an integrated circuit CI, allowing the establishment by the integrated circuit of near-field contactless communications with an external system. The antenna comprises several windings E1, E2 linked together by current-conducting means. Each winding has its ends connected to connection terminals of a circuit. The antenna then comprises, at the minimum, a winding E1 connected to the terminals for connection to the integrated circuit CI able to establish contactless communications with an external system, and a winding E2 connected to the terminals for connection to a peripheral component CP1, which can comprise one or more circuits connected in series, and which is powered remotely by the antenna.

19 Claims, 5 Drawing Sheets

ELECTRONIC DEVICE ENABLING NEAR-FIELD CONTACTLESS COMMUNICATIONS

PRIORITY CLAIM

This application claims priority to French Patent Application Number 08 57470, entitled Electronic Device Enabling Near-Field Contactless Communications, filed on Nov. 3, 2008.

FIELD OF THE INVENTION

The present invention relates to portable electronic devices comprising a planar antenna connected to at least one integrated circuit of the device, enabling near-field contactless communications with an external device, and which furthermore comprise one or more peripheral components which are powered remotely by the antenna. These peripheral components make it possible to afford additional functionalities. These are for example, and nonlimitingly, a display screen, light-emitting diodes, a buzzer, or a vibrator. The integration of additional functionalities such as these goes hand in hand with the expansion of the services offered by these portable electronic devices.

DESCRIPTION OF THE STATE OF THE ART

Portable electronic devices having by definition small dimensions, the remote powering of a peripheral component must be designed to obtain a sufficient supply of power while taking account of the space constraints on the device.

International patent application WO 02/01496 describes the use of energy coupling between two antennas, one linked to the integrated circuit which communicates with an external reader, the other linked to the peripheral circuit to be remotely powered. The problem posed by this technique is the low efficiency of the transmission by energy coupling between the two antennas, prohibiting the use of peripheral components with significant consumption and degrading the supply of power to the integrated circuit communicating with the reader.

Another technique described in international patent application WO 03/056510 consists in connecting the peripheral circuit or circuits and the integrated circuit which communicates with the external reader in parallel with the antenna. Though this technique is more effective than the previous one, it poses a problem of current distribution in the integrated circuit and the peripheral components: the current provided to the integrated circuit is lower, the effect of which is notably to decrease the range of the contactless communication.

The object of the present invention is to propose another alternative for remote supply of power to one or more peripheral components, which is more effective, with no negative come-back on the range of contactless communication, and which is easy to implement, in particular in devices of small dimensions, for example in substantially plane portable objects, such as chip cards or USB keys.

The antenna made in these portable electronic devices is a planar antenna, that is to say an antenna made in the surface plane of a support layer integrated into the device, by means of a winding of a track or of a metal wire thus forming one or more plane metal loops, in the surface plane of the support layer.

SUMMARY OF THE INVENTION

The idea underlying the invention is to make an antenna comprising several windings linked together by current-conducting means, each winding having its ends connected to connection terminals of a circuit. The antenna then comprises, at the minimum, a winding connected to the terminals for connection to the integrated circuit able to establish contactless communications with an external system, and a winding connected to the terminals for connection to a peripheral circuit, which can comprise one or more components connected in series and/or in parallel.

Thus, the invention relates to a portable electronic device comprising at least one integrated circuit and a planar antenna connected to said integrated circuit so as to establish a contactless communication with an external system, the device furthermore comprising at least one peripheral circuit connected to said antenna, allowing it to be remotely powered, characterized in that said antenna comprises:

an inductive winding, comprising one or more loops, one end of which starts from a first terminal for connection to said integrated circuit and the other end of which arrives at another terminal for connection to said integrated circuit, and an inductive winding, comprising one or more loops, one end of which starts from a first terminal for connection to said peripheral circuit and the other end of which arrives at another terminal for connection to said peripheral circuit, and in that said windings are linked by current-conducting means.

According to one embodiment, the windings of the antenna, the integrated circuit and the peripheral circuit or circuits are integrated into the body of a plane plastic object, preferably a chip card in the ISO 7816 format.

According to another embodiment, one or more peripheral circuits and the associated windings are embodied in a plane of a package in a cavity of which the plane plastic object comprising the contactless communication integrated circuit and the associated winding is placed.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

DETAILED DESCRIPTION

Figure 1:
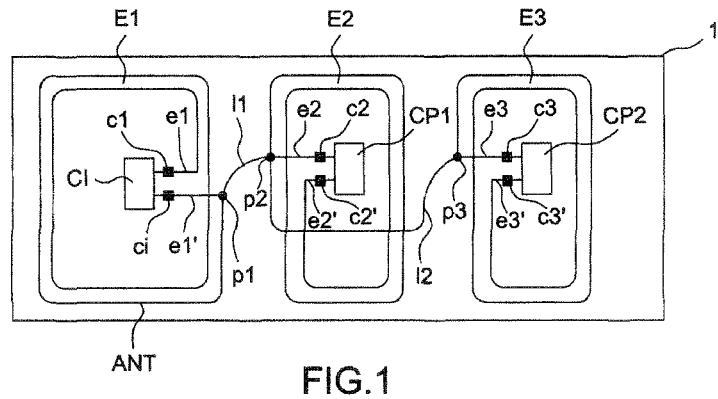
FIG. 1 is a schematic diagram of an antenna comprising three windings linked according to the invention.

FIG. 1 is a schematic diagram of a portable electronic device 1, according to the invention. It comprises a planar antenna ANT connected to an integrated circuit CI able to communicate in the near field with an external system and to be remotely powered by this system, typically according to the ISO 14443 standard. It also comprises peripheral components, in the example two components CP1 and CP2, remotely powered by the antenna ANT. These peripheral components do not communicate with the reader. A peripheral component will be for example a diode, a buzzer or a vibrator, or else a screen, which can ensure notably a user interface function, such as, for example, a function for warning of the presence of the field of an external reader, which function is activated by the powering of the component or components. The warning results in their activation: emission of a luminous spot, of a sound, vibration. This function can warn of the opening of a communication session with the external reader. But it is possible to have other peripheral components, such as for example a battery or a miniaturized hard disk. These peripheral components make it possible in a general way to expand the functionalities of the portable electronic device and/or to improve the user interface.

The antenna is in practice made according to any known technique from a suitable metallic material, for example according to a metal silk-screen printing or etching technology, or else according to a wire-based technology, with an insulant-sheathed metal wire.

The antenna ANT comprises several linked windings, allowing the current to flow between each winding.

More particularly in the example illustrated, the antenna comprises:

a winding E1 one end e1 of which is linked to a terminal c1 for connection to the integrated circuit CI, and the other end e1' of which is linked to another terminal ci for connection to the integrated circuit CI;

a winding E2 one end e2 of which is linked to a terminal c2 for connection to a peripheral component CP1, and the other end e2' of which is linked to another terminal c2' for connection to the peripheral component CP1;

a winding E3 one end e3 of which is linked to a terminal c3 for connection to as peripheral component CP2, and the other end e3' of which is linked to another terminal c3' for connection to the peripheral component CP2.

In the invention, the expression peripheral component such as CP1 or CP2 should be understood to mean a peripheral circuit, a diode for example, or else several peripheral circuits connected in series or in parallel, two diodes in series for example.

The windings of the antenna are linked together by current-conducting means. Typically a conducting link 11 is made between two points p1 and p2 of the windings E1 and E2, and a conducting link 12 is made between two points p2 and p3 of the windings E2 and E3.

These connection points p1, p2, p3 are preferably each situated in proximity to an end of the corresponding winding E1, E2, E3, in the example respectively the end e1', e2 and e3. It has indeed been possible to note that such connection points allowed the best results to be obtained in terms of current supply to each of the components, integrated circuit and peripheral components, with an optimal communication range.

Figure 2:
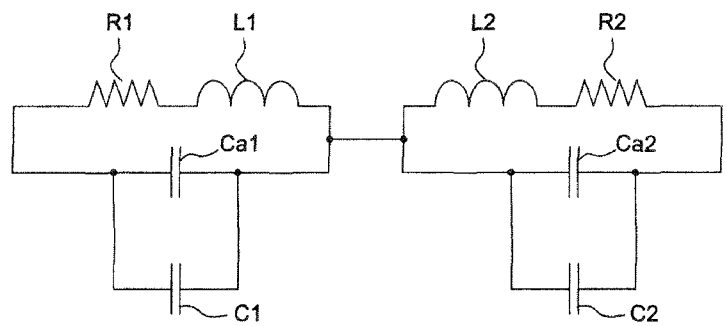
FIG. 2 illustrates a first embodiment of an antenna according to the invention, in one and the same surface plane.

The antenna thus made has a resonant frequency which is dependent on the characteristics of the windings of the antenna and the characteristics of the components which are linked thereto, notably their input capacitance and their equivalent resistance. This is illustrated in FIG. 2 which represents an equivalent electrical diagram of an antenna according to the invention, which would comprise two windings, for example the windings E1 and E2 of FIG. 1, respectively connected to the integrated circuit CI and to the peripheral component CP1.

The assembly E1, C1, E2, CP1 according to the invention is equivalent to two antennas which would each have their own resonant frequency if they operated alone. As they are linked, an antenna is obtained which resonates at a resonant frequency determined so as to correspond to the frequency of the contactless communication system.

More precisely, returning to FIG. 2, there is:

a first resonant circuit corresponding to the winding E1 and to the integrated circuit CI, which comprises: a capacitor C1, in parallel with a capacitor Ca1, in parallel with the series assembly of a resistor R1 and of an inductor L1; where R1 is the equivalent resistance of the integrated circuit C1, L1, the inductance afforded by the winding E1, Ca1, the capacitance afforded by the winding E1, and C1 the capacitance at the input of the integrated circuit. In a conventional manner, the natural resonant frequency $f_1$ of this circuit if it operated in isolation would be such that $L1.C1(2\pi f_1)^2=1$ a second resonant circuit corresponding to the winding E2 and to the peripheral component CP1 comprising: a capacitor C2, in parallel with a capacitor Ca2, in parallel with the series assembly of a resistor R2 and of an inductor L2; where R2 is the equivalent resistance of the peripheral component CP1, L2, the inductance afforded by the winding E2, Ca2, the capacitance afforded by the winding E2, and C2 the capacitance at the input of the peripheral component. The natural resonant frequency $f_2$ of this circuit if it operated in isolation would be such that: $L2.C2(2\pi f_2)^2=1$.

The windings E1 and E2 of the antenna according to the invention being linked, the two resonant circuits are linked: an antenna which resonates at a frequency f such that $(2\pi f)^2=(L1+L2)/(L1.L2(C1+C2))$ is obtained.

The windings of an antenna according to the invention are thus dimensioned as a function of the characteristics of the integrated circuit and of the peripheral component to obtain a resonant frequency f of the antenna corresponding to the optimal frequency sought for the near-field contactless communication system, i.e. typically a frequency of around 13.56 MHz (megahertz). In practice, the frequencies f1 and f2 of each resonant circuit considered in isolation lie between 10 MHz and 25 MHz.

It is recalled that in the realm of near-field communications, the range is typically less than 20 centimetres, the communication being established normally by intentional action of the bearer of the portable electronic device, who positions his device in a reader zone provided for this purpose.

Within this realm, widely used portable electronic devices are microcircuit cards in accordance with the ISO 7816 standard, or else electronic passports, or indeed USB keys. These various devices are substantially plane objects, made of dielectric material: plastic for cards and keys, generally a fibrous material such as paper for electronic passports. These are substantially plane objects of standardized dimensions, which may furthermore exhibit various mechanical constraints which limit the space available for making an antenna.

Various embodiments of an antenna according to the invention will be presented, which are notably applicable to such objects.

Hereinafter, the term integrated circuit designates the integrated circuit able to establish a near-field contactless communication with an external system and a peripheral component, a component remotely powered by the antenna. A peripheral component does not enter into communication with the external system.

Figure 3:
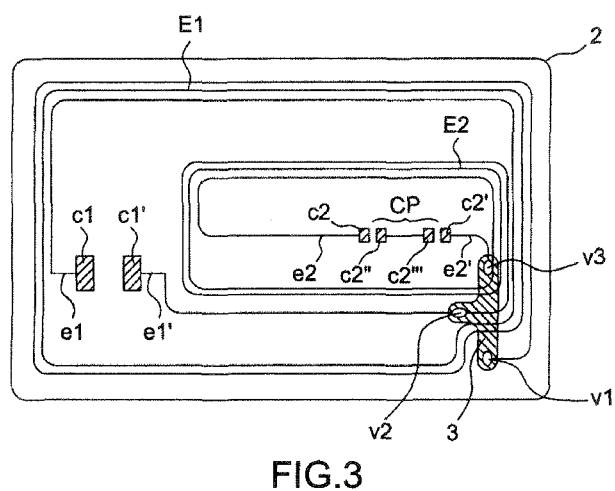
FIG. 3 is an equivalent electrical diagram of the antenna of FIG. 2.

FIG. 3 is a view from above of a support layer on which is formed an antenna according to a first embodiment in accordance with the invention.

The antenna support layer is for example a layer intended to be integrated into the thickness of the body of a substantially plane object, such as a chip card or an electronic passport for example.

In the example, the support layer comprises the terminals $c1$, $c1'$ for connection to the integrated circuit and the terminals for connection to a peripheral component. In the example, the peripheral component comprises two circuits in series, hence the two additional connection terminals in the figure, $c2''$, $c2'''$, between the "outermost" connection terminals $c2$ and $c2'$. It is always possible to consider for simplicity that there is a peripheral component CP connected between the two terminals $c2$ and $c2'$.

The antenna comprises two windings made in the surface plane of the support 2. A winding E1 has its two ends $e1$ and $e1'$ connected to the connection terminals $c1$ and $c1'$ for connection to the integrated circuit CI; a winding E2 has its two ends $e2$ and $e2'$ connected to the terminals $c2$, $c2'$ for connection to the peripheral component CP1.

This antenna support layer can be integrated into the thickness of a plane portable object, such as a microcircuit card, a USB key or an electronic passport according to any known technique.

This is the reason why the integrated circuit and the peripheral component are not represented in FIG. 2. They can indeed be connected to their respective connection terminals on the support layer 2 in a subsequent phase of manufacturing the portable object, according to any known technique.

The winding E2 is preferably made inside the winding E1, as illustrated, thereby making it possible notably to use the available surface area in an optimum manner. In this case the exterior winding which forms a largest antenna is preferably connected to the integrated circuit, the winding E2 made inside the winding E1 being smaller, but sufficing to ensure the remote powering of the peripheral component CP1.

In the example illustrated, the winding E1 starts from the end $e1$, connected to the terminal $c1$, to form turns or loops in the surface plane of the support which are increasingly wide, until it arrives at a pad $v1$ with metallized hole, which is connected to a pad $v2$ with metallized hole by a short-circuit 3 made in the rear face of the support 2, and then continues until the end $e1'$ connected to the terminal $c1'$.

The winding E2 starts from the end $e2$, connected to the terminal $c2$, to form turns or loops in the surface plane of the support which are increasingly wide, until it arrives at the pad $v2$ with metallized hole, which is connected to a pad $v3$ with metallized hole by the short-circuit 3 in the rear face of the support 2, and then continues until the end $e2'$ connected to the terminal $c2'$.

The pads with metallized holes $v1$, $v2$, $v3$ correspond to an embodiment of the windings by etching or silk-screen printing, requiring the use of connection bridges to make it possible to have the two ends of the winding on the same side, in the example inside the winding considered. These holes are used here to ensure at the same time the connection of the two windings E1 and E2, according to the principle of the invention. Thus, in the example, a short-circuit pattern 3 makes it possible to link the three pads $v1$, $v2$ and $v3$, which makes it possible at one and the same time to finish the formation of each of the windings, and to make the link between the two windings. This link is ensured well in proximity to an end of each winding. The term proximity is understood to mean the fact that the distance between the end of the winding considered, for example the end $e2'$ of the winding E2, and the connection point where the link from this winding E2 to the other winding E1 is made, that is to say the point $v2$ or $v3$, is small compared with the length of the winding E2 considered.

An antenna comprising two or more windings can thus be made as just described, on the surface of a plane support.

The antenna support obtained can be integrated according to the well known usual techniques in a microcircuit card, an electronic passport or a USB key, and more generally in any substantially plane portable object in which the various connection terminals will be appropriately connected to an integrated circuit and to one or more peripheral components.

Figure 4:
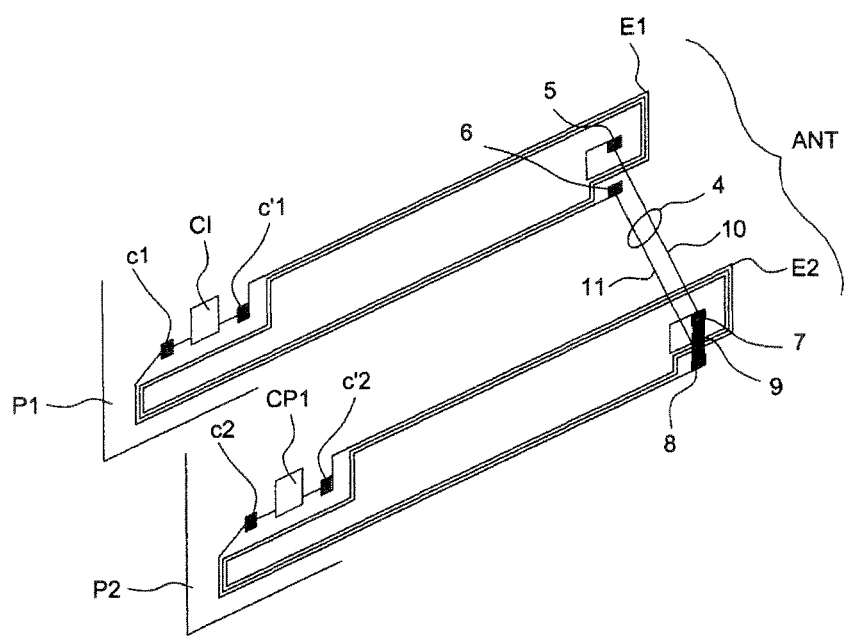
FIG. 4 illustrates another embodiment of the windings of an antenna according to the invention, in different surface planes.

FIG. 4 illustrates another embodiment of an antenna according to the invention, in which the windings are not made in the same plane. The figure thus illustrates in a schematic manner, in perspective, two windings E1 and E2 which form an antenna ANT of an integrated circuit CI of a portable electronic device, the winding E1 being made in a plane P1, and connected in this plane to the integrated circuit CI, the winding E2 being made in a plane P2 parallel to the plane P1, and connected in this plane to a peripheral component CP1 and the two windings being linked by a link 4, which in the example comprises:

two contacts 5 and 6 in the plane P1, two contacts 7 and 8 and a short-circuit 9 between those two contacts in the plane P2, and two links 10 and 11.

Typically the planes P1 and P2 can be two distinct support layers, or else the verso and recto faces of one and the same support layer. In this case the links 10 and 11 will typically be realized by metallized holes.

FIGS. 5a to 5f illustrate a corresponding variant embodiment of the two windings of the antenna each on a different surface plane in the thickness of the body of a plane object, preferably a microcircuit card.

Figure 5A:
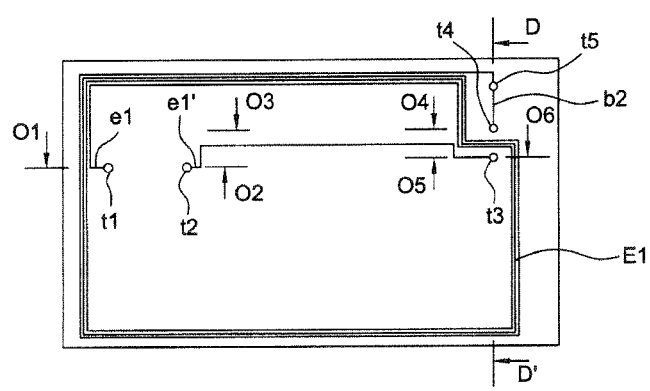
FIGS. 5*a* to 5*f* are views from above and in section illustrating an embodiment of an antenna having two windings, with as winding on each face of a support dielectric layer, more particularly intended to be integrated into a microcircuit card in the ID-1 format.

FIG. 5a represents the surface plane P1 supporting the winding E1.

Figure 5B:
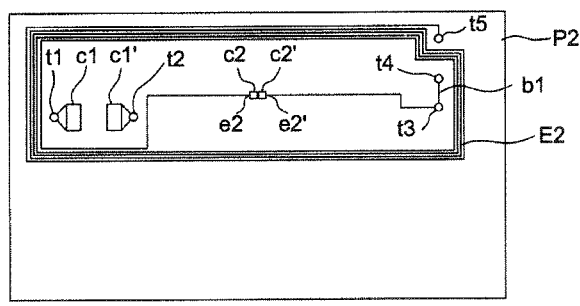

FIG. 5b represents the plane P2 supporting the winding E2 and the terminals $c1$, $c1'$ for connection to the integrated circuit and the terminals $c2$, $c2'$ for connection to the peripheral component.

Figure 5C:
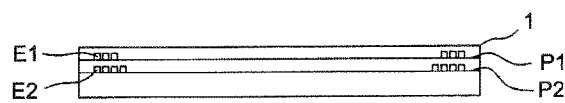

It is possible to consider that the two planes such as represented are intended to be stacked in the body of a plane object 1, as illustrated in FIG. 5c.

Figure 5D:
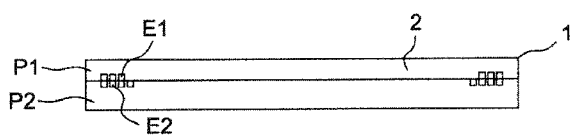

Preferably, corresponding to a practical realization of an antenna plane support, FIG. 5b should be regarded as a view front above in transparency of the plane P2, the elements represented in the figure being in reality made at the rear of this face, corresponding to making the windings E1 and E2 each on a respective face of one and the same support layer 2, intended to be integrated into the thickness of the body of a plane object 1, as illustrated in FIG. 5d.

Judiciously disposed metallized holes and short-circuit tracks make it possible to ensure:

the connection of the ends e1 and e1' of the winding E1 to the connection terminals c1 and c1', for the connection of the integrated circuit CI: holes t1 and t2.

the passage of the extremity of the winding E1 inside this winding so as to bring the end e1' of this winding square with the corresponding metallized hole t2: holes t5, t4, t3, track b1 of short-circuit t4-t5, track b2 oaf short-circuit t4-t3.

the passage of the extremity of the winding E2 inside this winding so as to bring the end e2' of this winding onto the corresponding connection terminal c2': holes t5, t4, t3, track b1 of short-circuit t4-t5, track b2 of short-circuit t4-t3.

Figure 5E:
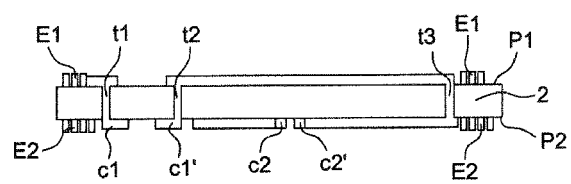
Figure 5F:
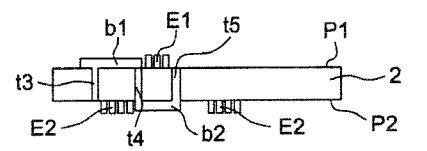

FIG. 5e is a transverse sectional view along the section line O1,O2,O3,O4,O5, and FIG. 5f is a transverse sectional view along the section line D, D'. These figures show the links on and between the two faces, for a corresponding embodiment on the verso face (P1) and recto face (P2) of one and the same support layer 2, as in FIG. 5d.

Figure 6:
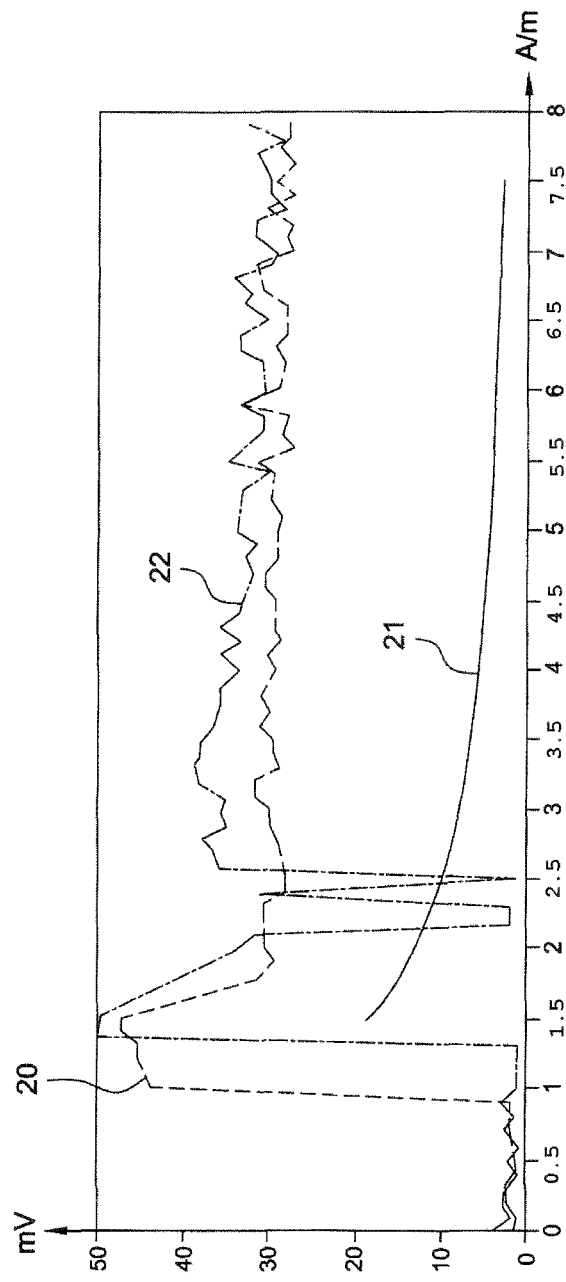
FIG. 6 illustrates the curves of retromodulation level that are obtained with a microcircuit card integrating such a support layer, with an antenna according to the invention, and with two non-linked antennas according to the state of the art.

A practical application of such an embodiment is a microcircuit card in the ISO 7816 format, with a winding E1 in the ID-1 format, that is to say substantially hugging the contour of the card, and connected to the integrated circuit, and a winding E2 in the semi-ID-1 format, that is to say substantially hugging the contour of the upper half of the card, and connected to the peripheral component. FIG. 6 shows the curve 20 of the retro-modulation level, measured in millivolts, obtained with a corresponding antenna, with a standardized ISO-10373 test bench. This curve shows that with the antenna thus obtained according to the invention, the measured retro-modulation level is everywhere above the limit curve 21 imposed by the standard. Curve 22 is obtained with the same two windings E1 and E2 connected in the same manner to the integrated circuit and to the peripheral component, but not linked: in this case, the curve is very straggly and plummets below the imposed minimum level, at several points. This FIG. 6 shows all the advantages of an antenna according to the invention.

Figure 7A:
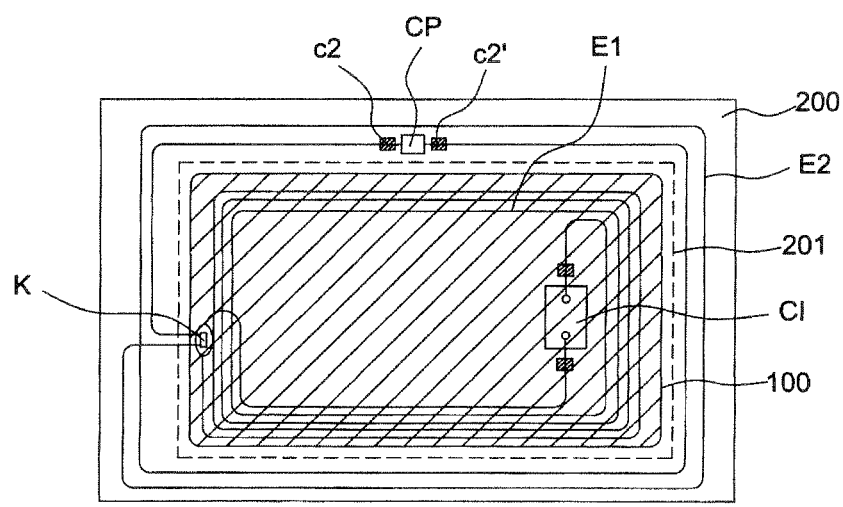
FIGS. 7a and 7b are views in section and from above illustrating another embodiment of an antenna according to the invention on two different supports.
Figure 7B:
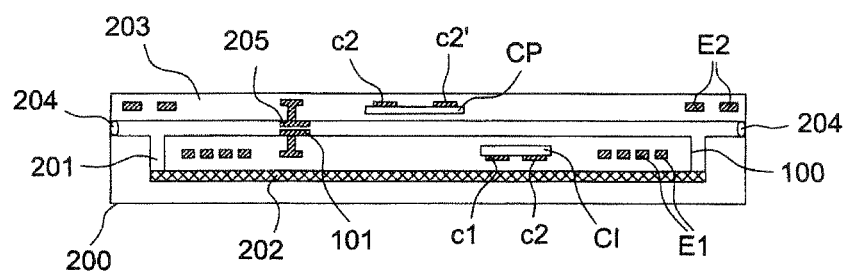

Another embodiment of the invention is illustrated in FIGS. 7a and 7b. In this embodiment, the two windings E1 and E2 are made in different surface planes. The first winding E1 is made in a plane object 100 intended to be placed in a package 200, in a cavity 201 fashioned for this purpose. The plane object 100, typically as microcircuit card, thus comprises in its thickness the winding E1 whose ends are connected to the terminals c1 and c1' for connection to the integrated circuit, and the integrated circuit CI connected to these terminals c1 and c1', by any known technique, for example by direct connection onto these pads (flip-chip arrangement), as illustrated schematically in FIG. 7b.

The winding E2 and the associated peripheral component CP are formed in the package, in a parallel plane of the object 100, and preferably in the cover 203 of the package (FIG. 7b). The reference 204 in FIG. 7b represents the hinges, making it possible to raise or lower the cover of the package. The link K between the two windings can then be simply made, by providing matching surface contacts, one, 101, at the surface of the plane object 100, the other, 205, at the surface of the internal face (interior) of the cover 203. The surface contact 101 on the plane object is connected to the winding E1 by a metallized hole, as illustrated in FIG. 7b.

In the example illustrated, the winding E2 and the peripheral component are advantageously integrated into the thickness of the cover, for example by using a moulding technique, to protect them. A metallized hole is then provided in the cover between the plane of the winding and the surface of the cover so as to link the winding E2 to the surface contact 205.

Variants of this embodiment can be envisaged. Notably the winding and the peripheral component can be integrated into the package in other ways, and the connection between this peripheral component winding and the winding in the plane object can be made differently, for example inside the cavity by suitable connection means.

Other peripheral components and their windings can be integrated into the package and/or into the portable object 100. In all cases, the antenna of the device is formed by all these windings linked together. The windings are linked inside the support on or in which they are made. The windings of the package and of the portable object are linked together when the object is placed in the package, by any suitable means.

The antenna's various windings, situated in the package 200 and in the portable object 100, are each defined so that ultimately, when they are linked, the antenna then has the desired resonant frequency, of around 13.56 MHz.

A portable device such as this, formed of a plane object placed in a package, can advantageously be used in conjunction with another portable electronic entity, to allow this entity to carry out additional functionalities. A ferrite layer 202 is then advantageously provided in the bottom of the cavity, to prevent the field disturbances which could be caused by metallic elements in the vicinity of the object.

In an example, the portable electronic entity is a portable telephone and the plane object is a bank card which makes it possible to carry out additional functionalities with the portable telephone, typically secure payments.

The invention which has just been described in relation to various embodiments makes it possible to embody a portable electronic device, allowing near-field contactless communications, with remotely powered peripheral components, which bring additional functionalities, without decreasing the quality of the communication.

The invention is not limited to the exemplary embodiments described. Notably, the examples illustrated correspond to antenna windings obtained by etching or silk-screen printing, which require the use of metallized holes to produce bridges for the crossovers of tracks. But it is known how to make windings in wire-based technology, with insulant-sheathed wire, which allows crossovers in the plane.

Thus, depending on the technology, the link between the windings will use more or fewer metallized holes. The link between the windings can also comprise a single connection point on each winding.

Depending on the possibilities for fitting the windings, for example depending on the zones reserved for the mooring actually used for this purpose, depending on the dimensions of the plane object, for example a card with the ISO 7816 standardized dimensions, or with small dimensions (sim card), it is possible to make several windings, allowing several peripheral components to be integrated. All the windings of the antenna are then linked together by current-conducting means. Preferably the windings disposed on one and the same surface plane will be such that a first winding is made inside a second larger winding, and so on and so forth until the last winding which will be the largest.

Preferably, the largest winding will be connected to the integrated circuit ensuring the contactless communications with an external system, the other windings of the peripheral components having dimensions less than or equal to the dimensions of the winding of the integrated component.

The terminals for connection to the integrated circuit and to the peripheral component(s) or circuit(s) can, depending on the embodiments, be made on one and the same plane, or on different planes, or on the verso and on the recto of one and the same layer, and the circuits themselves can be connected to these terminals in various ways following the usual techniques, in particular the techniques used in the realm of microcircuit cards.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An electronic device comprising at least one integrated circuit and a planar antenna connected to the integrated circuit so as to establish a near-field contactless communication with an external system, the device furthermore comprising at least one peripheral component connected to the antenna, allowing it to be remotely powered, wherein the antenna comprises:
   a. a first inductive winding, comprising one or more loops, one end of which starts from a first terminal for connection to the integrated circuit and another end of which arrives at a second terminal for connection to the integrated circuit, and further having at least one connection point near one of the first and second terminals;
   b. a second inductive winding, comprising one or more loops, one end of which starts from a first terminal for connection to the peripheral component and another end of which arrives at the second terminal for connection to the peripheral component; and
   c. a conductive link (wire) between the at least one connection point of the first inductive winding and the at least one connection point of the second inductive winding, such that the windings are linked by current-conducting means.

2. The electronic device according to claim 1, in which the current-conducting means linking two windings of the antenna are such that they link one or more connection points on each winding, the connection points of a winding being situated close to an end of the winding.

3. The electronic device according to claim 1, in which the current-conducting means comprise metallized holes.

4. The electronic device according claim 1, in which two or more windings of the antenna are disposed on one and the same surface plane, such that a first winding is made inside a second larger winding, and so on and so forth until the last winding.

5. The electronic device according to claim 1, in which each peripheral component comprises a circuit or several circuits connected in series and/or in parallel between the first and second terminals for connection to the peripheral component.

6. The electronic device according to claim 1, in which at least the winding of the integrated circuit and the integrated circuit are integrated into the thickness of a substantially plane dielectric material object, the winding being formed on a face of a support layer integrated into the thickness of the object.

7. The electronic device according to claim 6, in which the current-conducting means linking two windings of the antenna are such that they link one or more connection points on each winding, the connection points being situated close to an end of the winding.

8. The electronic device according to claim 6, in which the current-conducting means comprise metallized holes.

9. The electronic device according to claim 6, in which two or more windings of the antenna are disposed on one and the same surface plane, such that a first winding is made inside a second larger winding, and so on and so forth until the last winding.

10. The electronic device according to claim 6, in which each peripheral component comprises a circuit or several circuits connected in series and/or in parallel between the first and second terminals for connection to the peripheral component.

11. The electronic device according to claim 6, in which at least one winding of a peripheral component and the peripheral component are integrated into the thickness of the substantially plane object.

12. The electronic device according to claim 11, in which the peripheral component winding and the winding of the integrated circuit are formed on the same face of the support layer.

13. The electronic device according to claim 11, in which the peripheral component winding and the winding of the integrated circuit are respectively formed on opposite faces of the support layer.

14. The electronic device according to claim 11, in which the terminals for connection to the integrated circuit and the terminals for connection to the peripheral circuit are made on one and the same face of the support layer.

15. The electronic device according to claim 6, in which a plastic object is placed in a cavity of a package, and in which at least one winding of a peripheral circuit and said peripheral component are disposed in said package, said winding of the peripheral component being formed in a parallel plane of said plastic object.

16. The electronic device according to claim 15, in which said winding of the peripheral component and said peripheral component are formed on an internal face of a cover of said package or integrated into the thickness of said cover, contact pads of the windings being respectively provided in correspondence on said cover and at a surface of said plastic object, so as to come into contact when said cover is reclosed above the substantially plane dielectric material object, thus linking said integrated circuit winding and the peripheral component winding.

17. The electronic device according to claim 6, in which the plane dielectric object is a chip card in the ISO 7816 format or an electronic passport.

18. The electronic device according to claim 1, in which the peripheral component has a function for warning of the presence of a field of a reader, which function is activated by the powering of said peripheral component.

19. The electronic device according to claim 6, in which a peripheral component has a function for warning of the presence of a field of a reader, which function is activated by the powering of the component.

* * * * *

UNITED STATES PATENT AND TRADEMARK OFFICE
CERTIFICATE OF CORRECTION

PATENT NO. : 8,537,025 B2  
APPLICATION NO. : 12/610098  
DATED : September 17, 2013  
INVENTOR(S) : Loic Le Garrec et al.

Page 1 of 1

It is certified that error appears in the above-identified patent and that said Letters Patent is hereby corrected as shown below:

In the Specifications

Column 2, line 63, delete "with as" and replace with --with a--;
Column 3, line 2, delete ";" and replace with --.--;
Column 6, line 60, delete "front" and replace with --from--; and
Column 7, line 7, delete "oaf" and replace with --of--.

Signed and Sealed this
Seventeenth Day of December, 2013

Margaret A. Focarino
*Commissioner for Patents of the United States Patent and Trademark Office*